(12) United States Patent
Kamiyama (10) Patent No.: US 7,250,943 B2
(45) Date of Patent: Jul. 31, 2007

(54) DISPLAY CONTROL DEVICE

(75) Inventor: Masayuki Kamiyama, Kashiwara (JP)

(73) Assignee: Seiko Epson Corporation (JP)

( * ) Notice: Subject to any disclaimer, the term of this patent is extended or adjusted under 35 U.S.C. 154(b) by 585 days.

(21) Appl. No.: 10/867,567

(22) Filed: Jun. 14, 2004

(65) Prior Publication Data
US 2005/0012727 A1 Jan. 20, 2005

(30) Foreign Application Priority Data
Jun. 13, 2003 (JP) .............................. 2003-169638

(51) Int. Cl.
*G09G 5/00* (2006.01)
(52) U.S. Cl. .................... 345/204; 345/87; 345/156
(58) Field of Classification Search ................. 345/87, 345/95, 157, 169, 204–205, 210–211, 102, 345/214; 455/95, 574, 343.1, 127.1; 379/433.01, 379/433.06, 433.07, 433.1
See application file for complete search history.

(56) References Cited

U.S. PATENT DOCUMENTS

| | | | | |
|---|---|---|---|---|
| 5,841,431 A | * | 11/1998 | Simmers | 345/211 |
| 5,884,185 A | * | 3/1999 | Kim | 455/566 |
| 5,956,656 A | * | 9/1999 | Yamazaki | 340/7.55 |
| 6,445,143 B1 | * | 9/2002 | Min | 315/307 |
| 6,731,958 B1 | * | 5/2004 | Shirai | 455/574 |
| 6,822,645 B2 | * | 11/2004 | Noritake et al. | 345/211 |
| 7,181,006 B2 | * | 2/2007 | Shimazaki | 379/433.01 |

FOREIGN PATENT DOCUMENTS

JP 07-239674 9/1995

* cited by examiner

*Primary Examiner*—Richard Hjerpe
*Assistant Examiner*—Mansour M. Said
(74) *Attorney, Agent, or Firm*—Harness, Dickey & Pierce, P.L.C.

(57) ABSTRACT

A display control device is provided to realize a bypass function of a display controller by using fewer chip select signal lines without causing a malfunction. In the display control device, bypassing a display controller is realized by using one chip select signal line and one signal line for the general ports provided to a host. Therefore, bypassing the display controller can be realized by using fewer chip select signal lines. In addition, malfunctioning is prevented when a bypass mode is provided because the switching to/from the bypass mode and the transmission of the CS signal are not performed by one common chip select signal line.

4 Claims, 7 Drawing Sheets

| | Register 21a, 2nd bit | Register 21a, 9th bit | CS signal | SCS signal | Computing unit 21, Internal CS signal | Display driver A, CS signal | Display driver B, CS signal |
|---|---|---|---|---|---|---|---|
| 2CS mode | 0 | - | 1 | 1 | Invalid | Invalid | Invalid |
| | 0 | - | 0 | 1 | Valid | Invalid | Invalid |
| | 0 | 1 | 1 | 0 | Invalid | Valid | Invalid |
| | 0 | 0 | 1 | 0 | Invalid | Invalid | Valid |
| | 0 | - | 0 | 0 | Prohibition | Prohibition | Prohibition |
| 1CS mode | 1 | - | 1 | - | Invalid | Invalid | Invalid |
| | 1 | - | 0 | 1 | Valid | Invalid | Invalid |
| | 1 | 1 | 0 | 0 | Invalid | Valid | Invalid |
| | 1 | 0 | 0 | 0 | Invalid | Invalid | Valid |

DISPLAY CONTROL DEVICE

RELATED APPLICATIONS

This application claims priority to Japanese Patent Application No. 2003-169638 filed Jun. 13, 2003 which is hereby expressly incorporated by reference herein in its entirety.

BACKGROUND

1. Field of the Invention

The present invention relates to a display control device, controlling a display via a display driver.

2. Description of the Related Art

Conventionally, in devices such as cellular phones equipped with an LCD (Liquid Crystal Display) panel, the LCD panel is directly controlled by a display driver (hereinafter, simply referred to as a "driver"). In the basic configuration, the driver is controlled by a host equipped with a CPU (Central Processing Unit). However, recent cellular phones and the like have increased and sophisticated functions, and as a result, loads on hosts have become excessive.

For this reason, a configuration wherein the display controller takes part of the functions from the host has been increasing. The display controller is provided between the host and the driver, and is a device to perform part of the processing which the host has conventionally performed when the host outputs a control signal to the LCD panel, in place of the host. More specifically, the display controller takes functions to receive instructions from the host, to perform predetermined processing such as changing image size, and to output image data to the driver.

As for devices such as cellular phones equipped with a display controller in this way, when the display controller is not in use to provide power savings, the display controller is placed into a halt state (a state that a clock in the display controller is in a halt state). On the other hand, even when the display controller is in a halt state in such a case, a small amount of data may need to be discretely transmitted to the driver from the host. For example, a case that updating an indicator, indicating a radio wave receiving state, by only one scale in the whole screen on a display of cellular phone.

Figure 6:
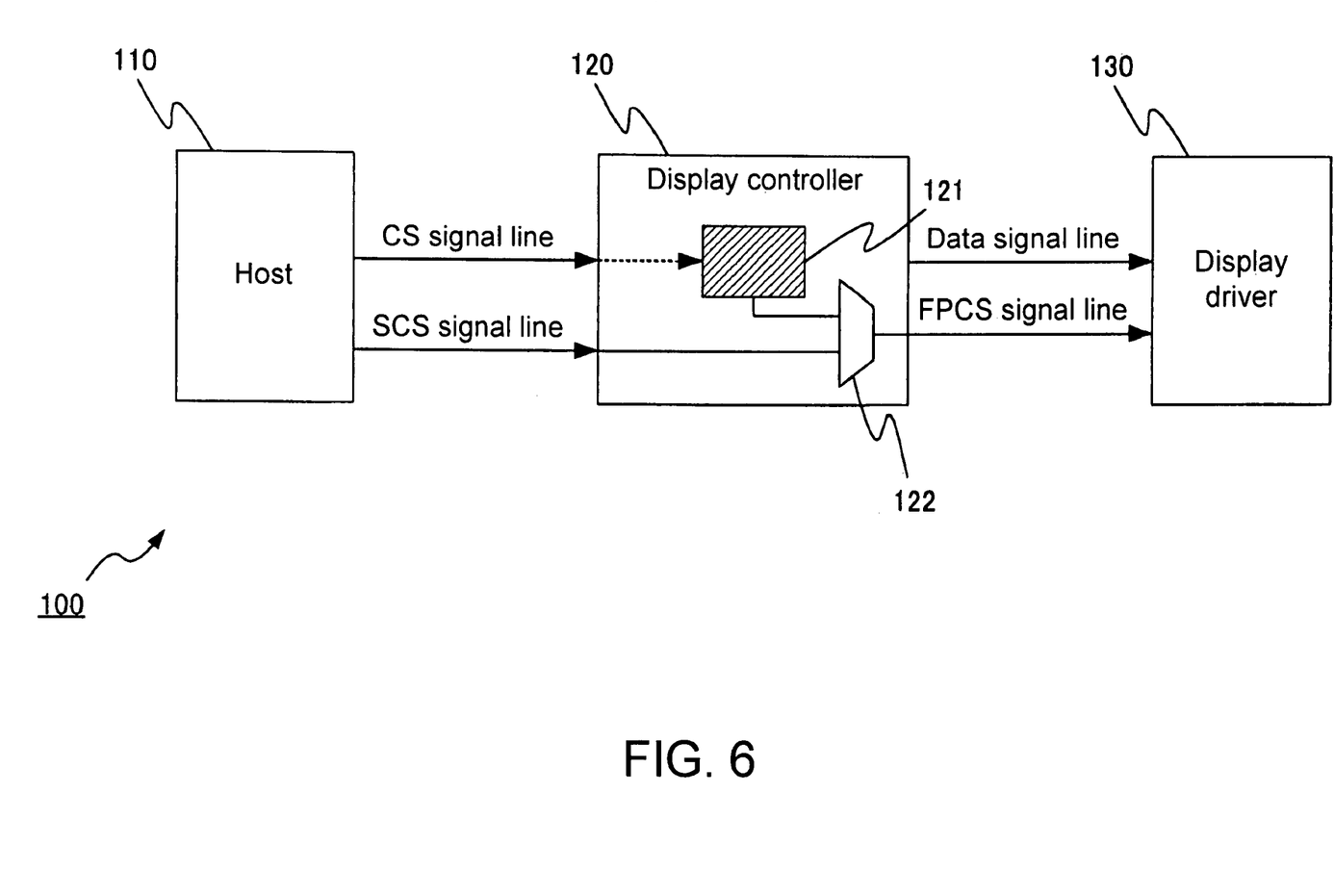
FIG. 6 is a diagram showing a conventional display controller 100 provided with a bypass function.

In such a case, in order to access the driver from the host with the display controller in a halt state, a bypass function is provided to transmit a signal through the display controller. FIG. 6 is a diagram showing a conventional display control device 100 equipped with a bypass function.

In FIG. 6, a host 110 is coupled to a display controller 120 by a chip select signal line (hereinafter, referred to as "CS signal line") and a sub-chip select signal line (hereinafter, referred to as "SCS signal line"). Furthermore, the display controller 120 is coupled to a driver 130 by a data signal line and a chip select signal line (hereinafter, referred to as "FPCS signal line"). Therefore, the host 110 can output a signal to the driver 130 only through the display controller 120.

As for the configuration shown in FIG. 6, when the display controller 120 is not in a halt state and a CS signal (chip select signal) is outputted to the display controller 120 from the host 110, the display controller 120 generates a signal (FPCS signal) corresponding to the CS signal in a computing unit 121 and outputs it to the driver 130.

On the other hand, when the display controller 120 is in a halt state, even when the CS signal is inputted from the host 110, the FPCS signal is not generated because the display controller 120 is in a halt state, therefore, the signal from the host 110 is not outputted to the driver 130. Thus, a selector 122 is provided in the display controller 120 and the selector 122 is set to a non-bypass mode (a state in which a bypass is not performed) in states other than the halt state, and the signal from the computing unit 121 in the display controller 120 is outputted to the driver 130.

When an access to the driver 130 from the host 110 is required in the halt state, the host 110 switches the selector 122 to the bypass mode (a state in which a bypass is performed) to pass the SCS signal (sub-chip select signal) outputted from the host 110, as it is, and outputs it to the driver 130.

However, according to the above-described scheme, the use of two CS signal lines (the chip select signal line and the sub-chip select signal line) is required so that the host 110 controls the display controller 120. Because the number of CS signal lines provided for the host 110 are limited, it is preferable that similar control is performed by using fewer of the CS signal lines.

Figure 7:
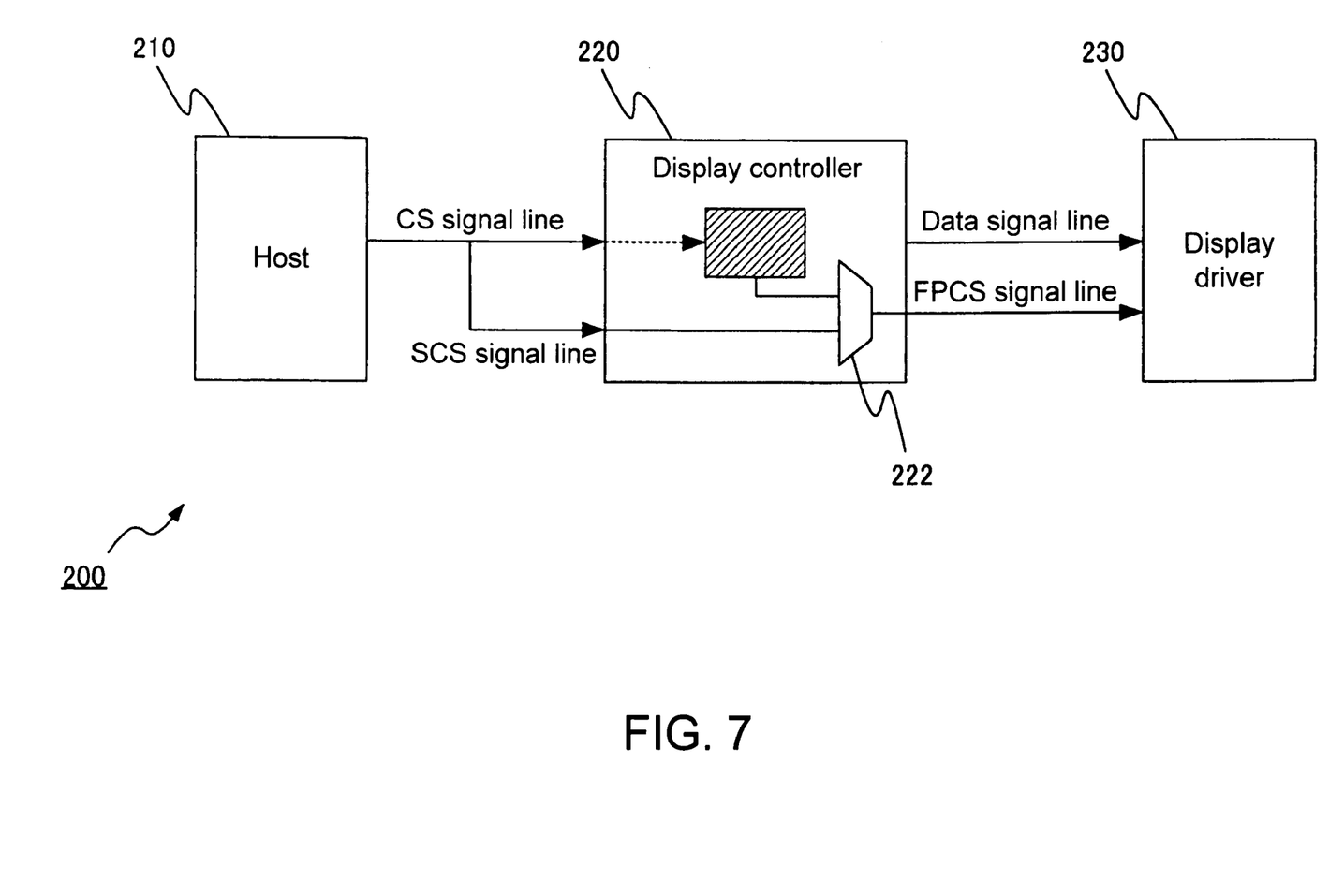
FIG. 7 is a diagram showing a configuration of a display control device 200 when a CS signal and a SCS signal are outputted by one common CS signal line.

Thus, outputting the above-described CS signal and SCS signal to the display driver 130 from the host 110 by using one CS signal line is considered. FIG. 7 is a diagram showing a configuration of a display control device 200 outputting the CS signal and the SCS signal by one common CS signal line. In FIG. 7, the host 210 is coupled to the display controller 220 by a CS signal line and outputs a CS signal and a SCS signal to a display controller 220 by the CS signal line. Furthermore, the display controller 220 is coupled to a driver 230 by a data signal line and a FPCS signal line. Except for the above-described configuration, each function unit in the display control device 200 is similar to the corresponding unit in the display controller 100 shown in FIG. 6.

As for the display control device 200 shown in FIG. 7, when a switching signal to the bypass mode is outputted by the CS signal line during the non-bypass mode, a selector 222 in the display controller 220 is switched to the bypass mode, and after that, the SCS signal outputted from the host 210 is outputted to the driver 230.

On the other hand, when switching to the non-bypass mode during the bypass mode, the host 210 outputs a signal for switching the selector 222 in the display controller 220 from the bypass mode to the non-bypass mode to the display controller 220. However, at this time, the selector 222 is in the bypass mode. Therefore, the signal for switching may be bypassed and outputted to the driver 230 due to a time lag when the selector 222 is switched. When the switching of the bypass mode and the transmission of the CS signal are performed by one common chip select signal line, the signal for switching the bypass mode becomes noise, which causes an LCD panel or the like to malfunction.

A related drive control of an LCD panel is disclosed in Japanese laid-open patent publication No. H7-239674.

The related art described in Japanese laid-open patent publication No. H7-239674 concerns solving a problem of signal processing of a driver, controlling an LCD panel, but it does not solve the above-described problem on a display controller. Thus, it has been difficult to realize a bypass function by using fewer of the chip select signal lines without causing a malfunction in the display controller.

Therefore, an object of the present invention is to realize a bypass function for a display controller by using fewer of chip select signal lines without causing a malfunction.

SUMMARY

In order to solve the above-described problem, the present invention is a display control device comprising: a host (for example, a host 10 in FIG. 1) performing an instruction to display an image on a display; and a display controller (for example, a display controller 20 in FIG. 1) coupled to the host by a predetermined number of chip select signal lines and general signal lines (for example, a signal line for general port, which is not a dedicated line for chip select signal) performing a predetermined image processing based on an instruction from the host, and outputting a control signal to a display driver (for example, a display driver 30 in FIG. 1), directly controlling the display, wherein the display controller is allowed to be in a halt state (for example, a halt state of the clock) to halt an operation in a predetermined case, and having a bypass function for allowing the host to access to the display driver when the display controller is in a halt state, wherein the host is allowed to switch a normal state (for example, a "non-bypass" mode in an embodiment of the present invention), outputting a chip select signal to the display controller, and a bypass state (for example, a "bypass" mode in an embodiment of the present invention), outputting a chip select signal to the display driver, by using one chip select signal line and the general signal line.

Furthermore, the host outputs a chip select signal to the display controller by the chip select signal line, and outputs a signal for switching whether the bypass function is used or not by the general signal line. Furthermore, as for the display controller, the chip select signal line is coupled as an internal chip select signal line for the display controller, the general signal line is coupled as a chip select signal for the display driver when bypassing, and the host switches whether the bypass function is used or not by making the chip select signal and the general signal as predetermined output values.

Such a configuration, for example, corresponds to a 2CS mode in an embodiment of the present invention, and a switching operation (change of signal path) of the selector is not performed in the display controller when switching whether the bypass function is used or not, and the output value of the general signal is changed in the host. Furthermore, as for the display controller, the chip select signal line is coupled to a first selector (for example, a selector 22a in an equivalent circuit in FIG. 4), which is allowed to switch whether an input signal is outputted to an internal chip select signal line for the display controller or not, and to a second selector (for example, a selector 22b in the equivalent circuit in FIG. 4), which is allowed to switch whether an input signal is outputted to a chip select signal line for the display driver or not when bypassing, and the general signal line is coupled as a selecting instruction signal (a signal to select either of the input signals) for the first and second selectors, and the chip select signal is alternatively outputted to the internal chip select signal line or the chip select signal line for the display driver by either of the first or second selectors, corresponding to the output value of the general signal.

Such a configuration, for example, corresponds to a 1CS mode in an embodiment of the present invention. Because switching whether the bypass mode is used or not is specifically performed by the general signal line, an adequate chip select signal can be outputted after the mode is reliably switched. According to the present invention, the bypass function for the display controller can be realized by using one of the chip select signal lines and one of the general signal lines provided to the host.

Accordingly, the bypass function for the display controller can be realized by using fewer chip select signal lines. Furthermore, malfunctioning can be prevented from being caused when switching the bypass mode because switching whether the bypass function is used or not and the transmission of the chip select signal are not performed by one common chip select signal line.

In other words, according to the present invention, the bypass function for the display controller can be realized by using fewer chip select signal lines without causing a malfunction.

DETAILED DESCRIPTION

An embodiment of a display control device according to the present invention will be described with reference to drawings. A display control device according to the present invention controls indications or the like on a display of a device (for example, a cellular phone) equipped with a display such as an LCD panel. Furthermore, the display control device according to the present invention comprises a display controller and has a function to bypass the display controller when it is in a halt state. Whether bypassing is performed or not is switched by using a general interface in a host, and the bypass function can be realized by using only one chip select signal without causing a malfunction.

Figure 1:
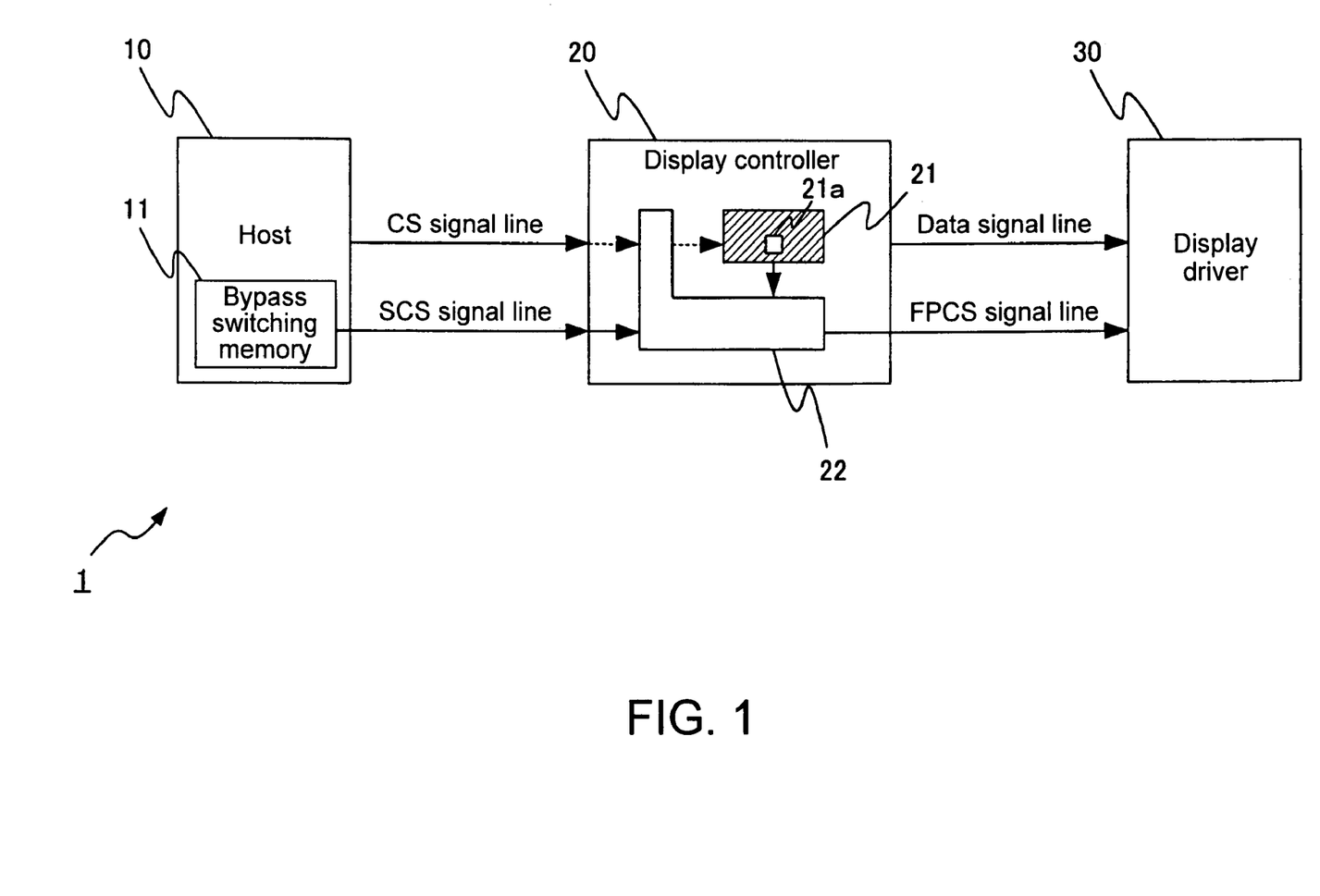
FIG. 1 is a diagram showing a configuration of a display control device 1 applying the present invention.

At first, a configuration will be described. FIG. 1 is a diagram showing a configuration of a display control device 1 applying the present invention. In FIG. 1, the display control device 1 comprises a host 1, a display controller 20, and a driver 30. The host 10 controls a whole device equipped with the display control device 1, and comprises a CPU (Central Processing Unit), a memory or the like.

Furthermore, the host 10 is provided with a bypass switching memory 11, storing a switching code for whether a bypass of the display controller is performed or not. When the switching code is "0", it means that the bypass is performed, and when the code is "1", it means that the bypass is not performed. Additionally, the host 10 is coupled to the display controller 20 by a CS signal line (chip select signal) and a SCS signal line (sub-chip select signal line).

The CS signal line is a signal line provided to the host 10, which is dedicated to identify a plurality of devices coupled to one memory space, and the SCS signal line is a signal line using a general port provided to the host 10. A signal (SCS signal) having a level corresponding to data ("0" or "1"), stored in the bypass switching memory 11, is outputted to the SCS signal line.

The display controller 20 includes a computing unit 21, processing an image to be displayed on a display, and a bypass circuit 22, switching a signal path depending on whether the display controller 20 is to be bypassed or not. The computing unit 21 has the main functions of the display controller 20, more specifically, comprises a processing device for transforming an image size, a buffer for stationary or moving image, a coding/decoding device (codec), a compression/decompression device, and a display buffer, storing data to be displayed on the display.

Furthermore, the computing unit 21 includes a register 21a, storing data related to a setting or an output of the bypass circuit 22. The register 21a is an asynchronous type register (a register, which is independent from the clock of the computing unit 21), which can store 16 bits of data, and the respective data of the setting or the output of the bypass circuit 22 is stored in the predetermined address of the register 21a.

For example, a setting value, determining whether the display control device 1 is used in either the 2CS mode or the 1CS mode, is stored in the second bit. The 2CS mode is a mode to control inside of the display controller 20 by a CS signal, and to control a device such as a display by a SCS signal. On the other hand, the 1CS mode is a mode to control both of the display controller 20 and the device such as a display by a CS signal.

Furthermore, a specified value, determining which one of two devices, selectable by the CS signal, is selected, is stored in the ninth bit. In addition, a description will be given on an assumption that the selectable two devices are two display drives A and B. Additionally, various settings such as a bypass output permission, a read/write direction switching are stored in the eighth bit through the thirteenth bit.

Figure 2:
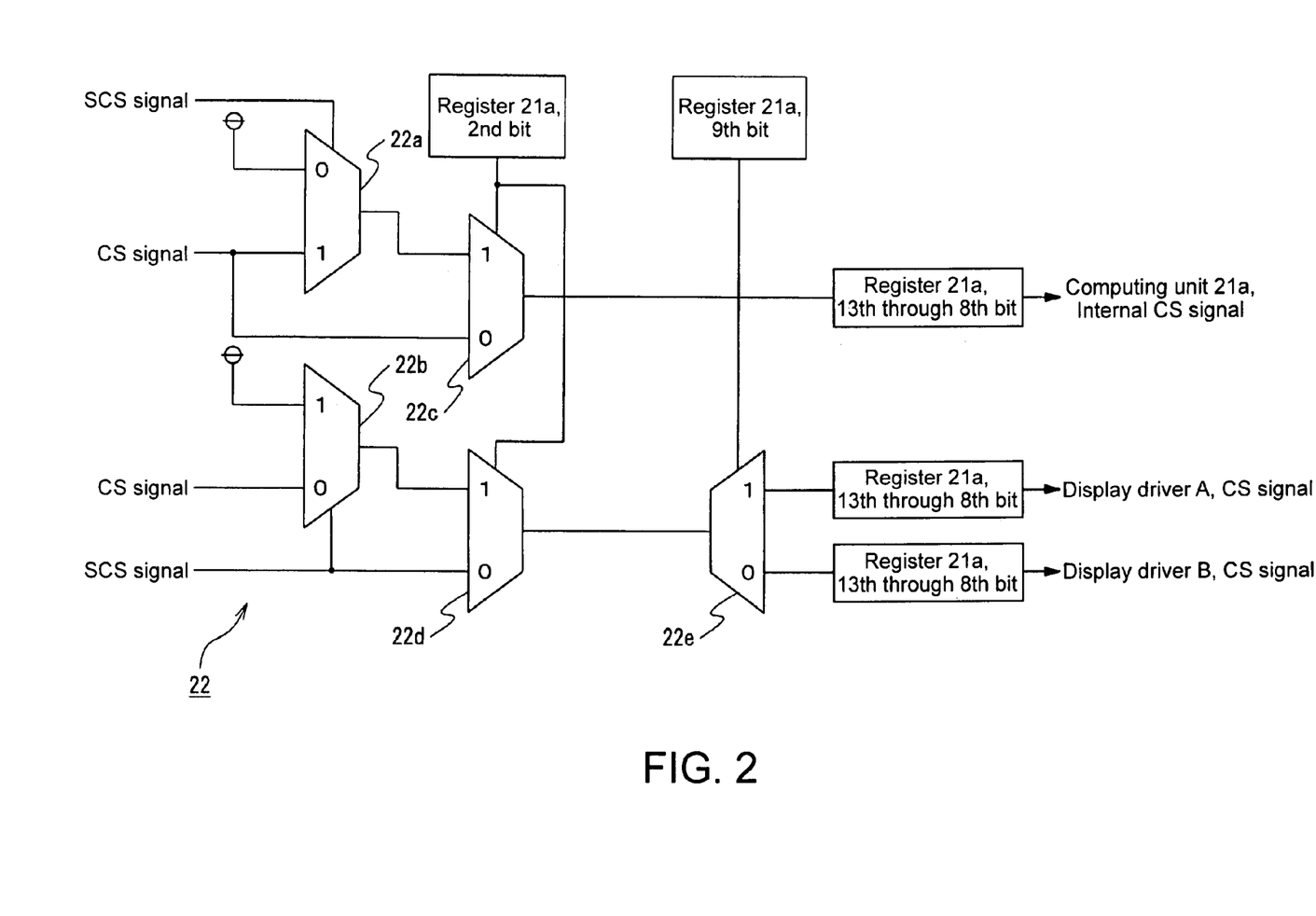
FIG. 2 is a diagram showing an example of a circuit configuration of a bypass circuit 22.

The bypass circuit 22 switches either one of the signal paths, that is, whether inputting the CS signal to the computing unit 21, or outputting the CS signal to the driver by bypassing the display controller 20 corresponding to the SCS signal inputted from the host 10. FIG. 2 is a diagram showing an example of a circuit configuration of the bypass circuit 22. As shown in FIG. 2, a bypass circuit 22 is configured to include selectors 22a through 22e. Each of the selectors 22a through 22d is a circuit to select either one of two inputs (hereinafter, referred to as "selecting object signal") and output it as one output, and determines the output based on a selecting instruction signal for selecting either one of the selection object signals. Furthermore, the selector 22e is a circuit to select either one of two output destinations for one input and to output it, and determines the output destination based on the selecting instruction signal for selecting either one of the output destinations.

As shown in FIG. 2, to the selector 22a, a high level signal and a CS signal showing "1" are inputted as the selecting object signals, and a SCS signal is inputted as the selecting instruction signal. The selector 22a outputs the high level signal when the selecting instruction signal is "0", and outputs the CS signal when the selecting instruction signal is "1". To the selector 22b, a high level signal and a. CS signal showing "1" are inputted as the selecting object signals, and a SCS signal is inputted as the selecting instruction signal. The selector 22b outputs the high level signal when the selecting instruction signal is "1", and outputs the CS signal when the selecting instruction signal is "0".

The output of the selector 22a and the CS signal are inputted as the selecting object signals to the selector 22c, and a signal corresponding to the setting value of the "CS mode", stored in the register 21a, is inputted as the selecting instruction signal. The selector 22c outputs the output of the selector 22a when the selecting instruction signal is "1", and outputs the CS signal when the selecting instruction signal is "0". The output data of the selector 22c is outputted as an internal CS signal of the computing unit 21, corresponding to various settings of the eighth bit through the thirteenth bit of the register 21a.

The output of the selector 22b and the CS signal are inputted as the selecting object signals to the selector 22d, and a signal corresponding to the setting value of the "CS mode", stored in the register 21a, is inputted as the selecting instruction signal. The selector 22d outputs the output of the selector 22b when the selecting instruction signal is "1", and outputs the SCS signal when the selecting instruction signal is "0".

The output of the selector 22d is inputted to the selector 22e, and a signal corresponding to a specified value (a specified value, designating either of the selectable display drivers A or B), stored in the register 21a, is inputted as the selecting instruction signal. The selector 22e outputs the input to the display driver A when the selecting instruction signal is "1", and outputs the input to the display driver B when the selecting instruction signal is "0". The output data of the selector 22e is outputted to the driver 30 as the CS signal for each device (display drivers A and B), corresponding to various settings of the eighth bit through the thirteenth bit of the register 21a.

The driver 30 directly controls the coupled display based on the instruction signal inputted from the host 10 or the display controller 20. Specifically, the driver 30 controls the driving voltage of the display, and outputs image data to be displayed on the display with an address sequence of frames. Next, an operation will be described.

Figure 3:
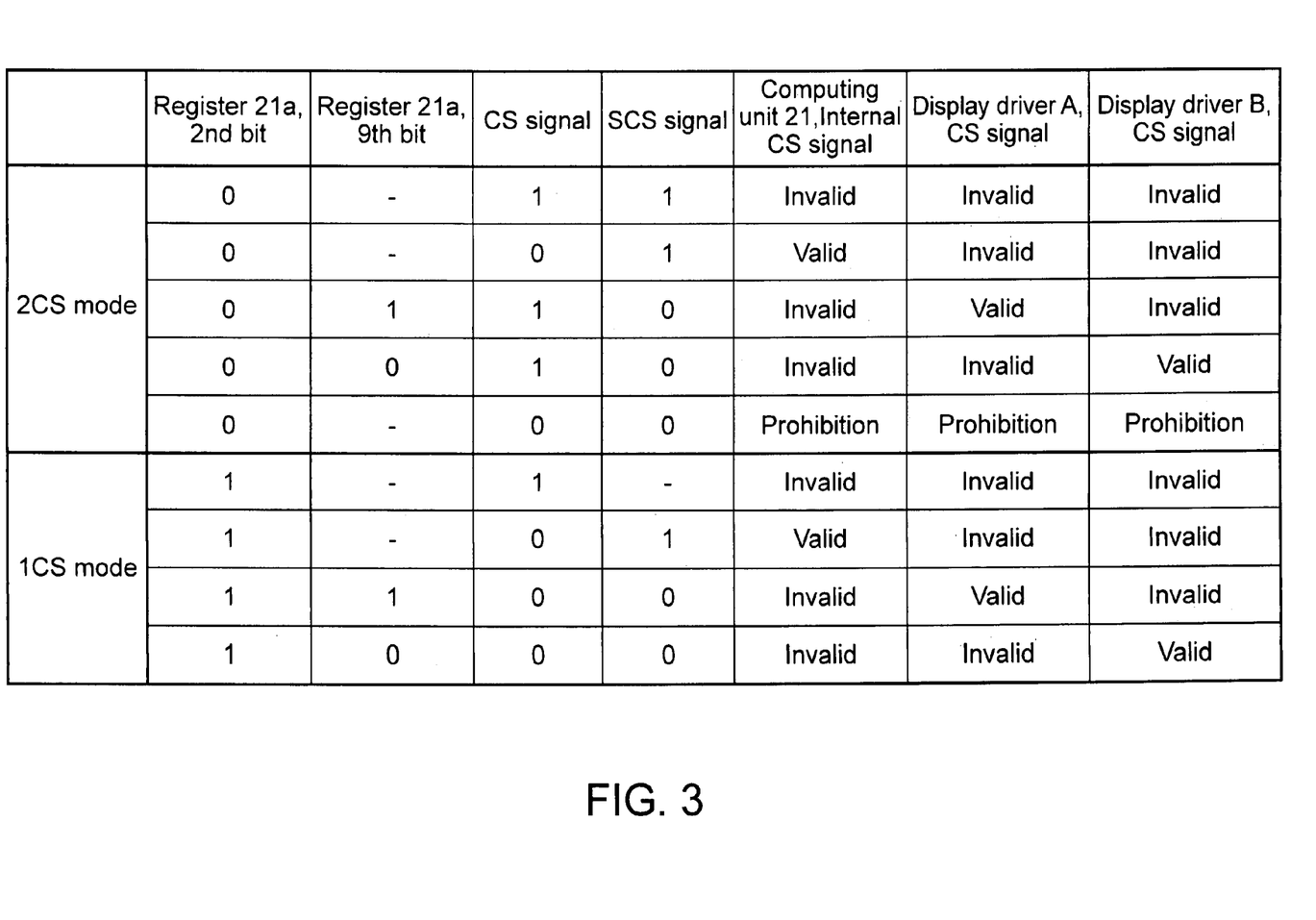
FIG. 3 is a truth table of the bypass circuit 22 in a 2CS mode and a 1CS mode.
Figure 4:
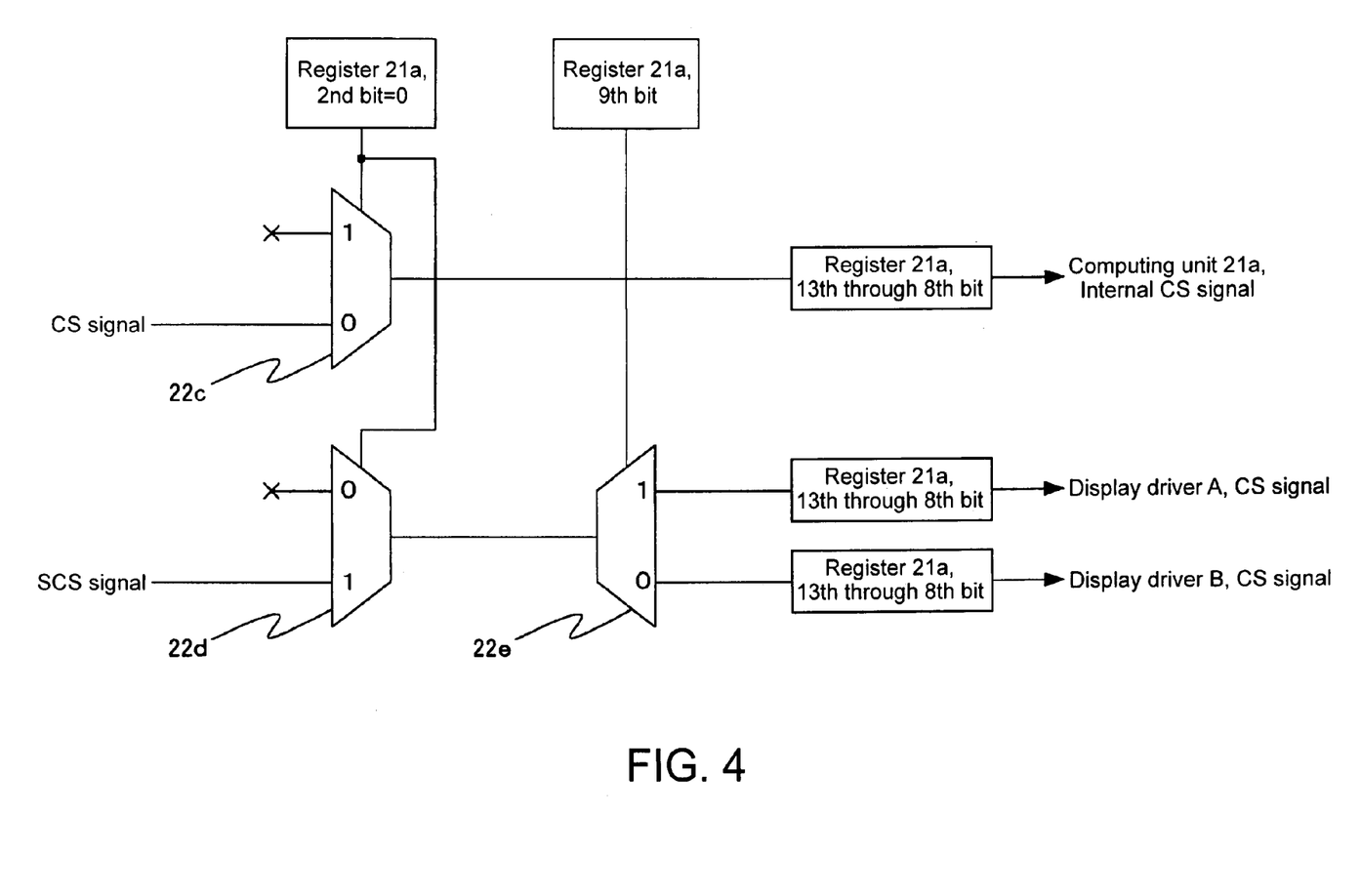
FIG. 4 is a diagram showing an equivalent circuit of the bypass circuit 22, set to the 1CS mode.

FIG. 3 is a truth table of the bypass circuit 22 for the 2CS mode and 1CS mode. At first, in case of the 1CS mode, "1" is set to the second bit of the resister 21a in the display control device 1. FIG. 4 is a diagram showing an equivalent circuit of the bypass circuit 22, set to the 1CS mode.

As shown in FIG. 4, the CS signal, outputted from the host 10, is outputted as the internal CS signal of the computing unit 21 or the CS signal of either of the display drivers A or B by the bypass, corresponding to the value of the SCS signal and the setting of the bypass circuit 22. Specifically, as shown in FIG. 3, when the CS signal is "1", neither device is selected, therefore, the SCS signal is not outputted. Thus, the selection of any of the computing unit 21 and the display drivers A and B are in "invalid" states.

On the other hand, when the CS signal is "0", the CS signal is in a state that either one of devices is selected. When the SCS signal is "1", because it is not in a state of performing a bypass, the selection of the computing unit 21 is in a "valid" state, and the selection of the display drivers A and B are in "invalid" states.

Furthermore, when the SCS signal is "0", it is in a state of performing a bypass (bypass mode). When "1" is set to the ninth bit of the register 21a, the selection of the display driver A is in a "valid" state and selection of the display driver B is in an "invalid" state.

On the other hand, when "0" is set to the ninth bit of the register 21a, the selection of the display driver B is in a "valid" state, and the selection of the display driver A is in a "invalid" state. By such operations, in the 1CS mode, the control of inside the bypass circuit 22 and the device control (chip select) by the bypass can be performed by the CS signal, outputted from the host 10. At this time, the SCS signal functions as a signal to control whether the bypass is performed or not.

Figure 5:
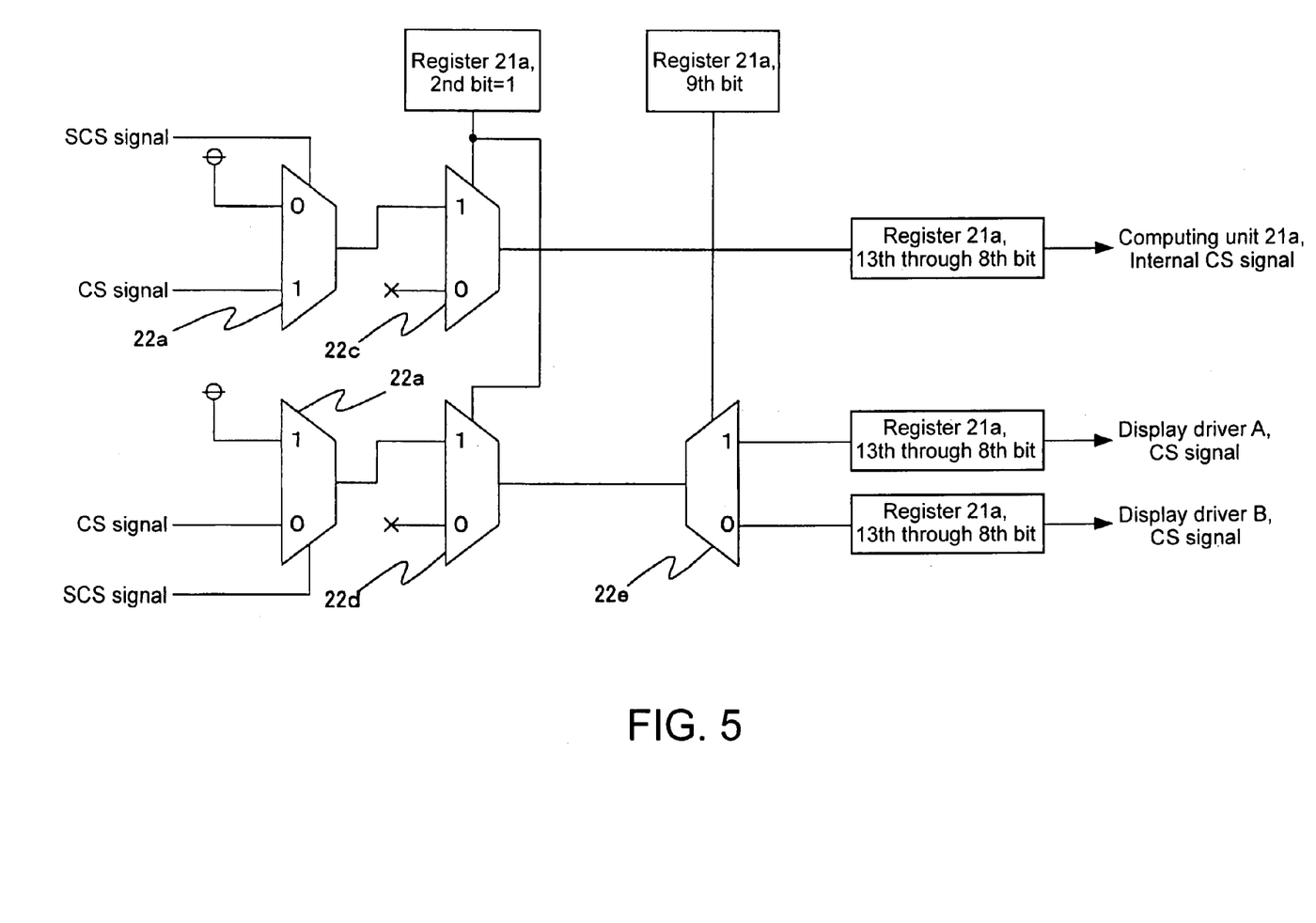
FIG. 5 is a diagram showing an equivalent circuit of the bypass circuit 22, set to the 2CS mode.

Next, in case of the 2CS mode, "0" is set to the second bit of the register 21a in the display control device 1. FIG. 5 is a diagram showing an equivalent circuit of the bypass circuit 22, set to the 2CS mode. As shown in FIG. 5, corresponding to the value of the SCS signal and the setting of the bypass circuit 22, the CS signal, outputted from the host 10, is outputted as an internal CS signal of the computing unit 21, or the SCS signal, outputted from the host 10, is outputted as a CS signal of either one of the display drivers A or B by the bypass.

Specifically, as shown in FIG. 3, when the CS signal is "1" and the SCS signal is also "1", the selection of any of the computing unit 21 and the display drivers A and B are in "invalid" states because it is in a state that neither device is selected. On the hand, when the CS signal is "0" and the SCS signal is "1", it is in a state that the CS signal selects the computing unit 21 and the SCS signal does not perform a bypass and selects no devices.

Furthermore, when the CS signal is "1" and the SCS signal is "0", it is in a state that the CS signal does not select the computing unit 21 and the SCS signal performs a bypass. When "1" is set to the ninth bit of the register 21a, the selection of the display driver A is in a "valid" state and the selection of the display driver B is in an "invalid" state.

On the other hand, when "0" is set to the ninth bit of the register 21a, the selection of the display driver B is in a "valid" state, and the selection of the display driver A is in a "invalid" state. When both of the CS signal and the SCS signal are "0", the operation is "prohibited" because a collision occurs for writing on the register 21a (in other words, it is in a state that both of the computing unit 21 and the other device by the bypass are simultaneously accessed).

By such an operation, in the 2CS mode, a control inside of the bypass circuit 22 can be performed by the CS signal outputted from the host 10, and a control of the device by the bypass can be performed by the SCS signal. As described above, in the display control device 1 according to the embodiment, the bypass function of the display controller 20 can be realized by using one of the chip select signal lines and one of the signal lines for general ports provided to the host 10.

Therefore, the bypass function of the display controller 20 can be realized by using fewer chip select signal lines. Moreover, unlike the related art in FIG. 7, malfunctioning can be prevented from being caused when switching the bypass mode, because the switching of the bypass mode and the transmission of the CS signal are not performed by one common chip select signal line.

For example, in the 1CS mode in the embodiment, as shown in FIG. 4, because switching whether the bypass mode is used or not is specifically performed by the signal lines for general ports, an adequate CS signal can be outputted after the mode is reliably switched. Furthermore, in the 2CS mode, as shown in FIG. 5, a control object (display controller 20) by the CS signal line is different from control objects (displays A and B) by the SCS signal line, and the host 10 switches whether the bypass mode is used or not by switching the output value of the SCS signal to "0" or "1". That is, when the bypass mode is switched, a switching operation (change in signal path) of the selector in the display controller 20 is not performed, and the output value of the SCS signal is changed in the host 10.

Therefore, as described above, malfunctioning can be prevented from being caused when the bypass mode is switched.

What is claimed is:

1. A display control device, comprising:
   a host performing an instruction to display an image on a display; and
   a display controller coupled to the host by a predetermined number of chip select signal lines and general signal lines, the display controller performing predetermined image processing based on an instruction from the host and outputting a control signal to a display driver directly controlling the display, wherein
   the display controller includes:
      a halt state in which operation is halted in a predetermined case; and
      a bypass function with which the host accesses the display driver when the display controller is in the halt state; and
   the host is switchable between a normal state in which a chip select signal is outputted to the display controller and a bypass state in which the chip select signal is outputted to the display driver, the switching being accomplished by using one of the chip select signal lines and one of the general signal lines.

2. The display control device according to claim 1, wherein the host outputs the chip select signal to the display controller via the one chip select signal line, and outputs a signal to switch whether the bypass function is used via the one general signal line.

3. The display control device according to claim 1, wherein:
   the one chip select signal line is coupled as an internal chip select signal line for the display controller;
   the one general signal line is coupled as a chip select signal line for the display driver when bypassing, in the display controller; and
   the host switches whether the bypass function is used by making the chip select signal and the general signal equal to predetermined output values.

4. The display control device according to claim 1, wherein:
   the one chip select signal line is coupled to a first selector which switches whether an input signal is outputted to an internal chip select signal line for the display controller, and to a second selector which switches whether an input signal is outputted to a chip select signal line for the display driver when bypassing, in the display controller; and
   the one general signal line is coupled as a selecting instruction signal for the first and second selectors,
   the chip select signal is alternatively outputted to the internal chip select signal line and the one chip select signal line for the display driver by one of the first and second selectors corresponding to the output value of the general signal.

* * * * *